S. PORTER.
Strainers for Sinks, &c.
No. 158,120. Patented Dec. 22, 1874.
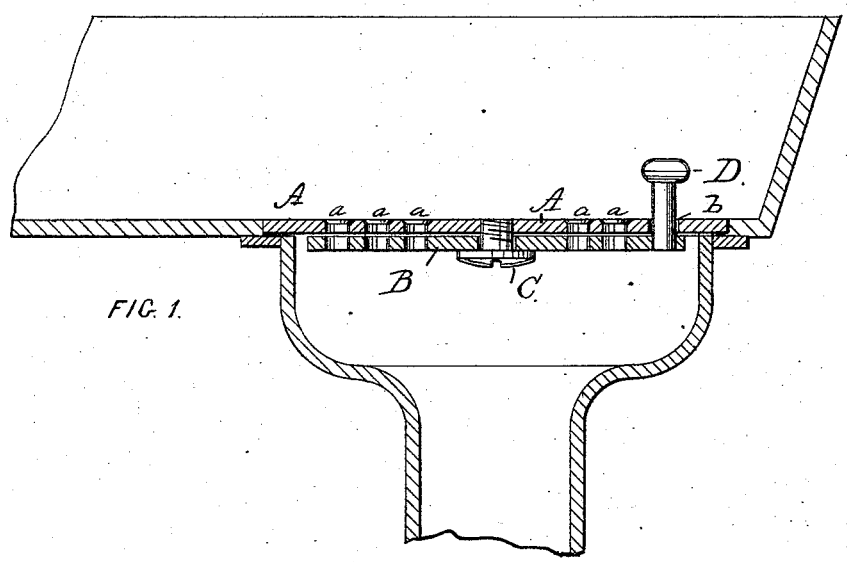
FIG. 1.
FIG. 2.
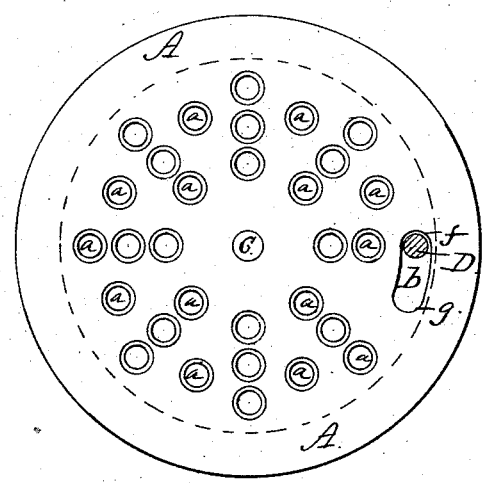
WITNESSES.
J. A. Pease
W. Dinsmore.
INVENTOR.
Stephen Porter
Per Brown Brothers
Attorneys

UNITED STATES PATENT OFFICE.

STEPHEN PORTER, OF CHARLESTOWN, MASSACHUSETTS.

IMPROVEMENT IN STRAINERS FOR SINKS, &c.

Specification forming part of Letters Patent No. 158,120, dated December 22, 1874; application filed August 5, 1874.

*To all whom it may concern:*

Be it known that I, STEPHEN PORTER, of Charlestown, in the county of Suffolk and State of Massachusetts, have invented an Improved Strainer for Sinks, of which the following is a specification:

This invention relates to the ordinary strainer located at the mouth of the waste-pipe of sinks; and it consists in the combination therewith of a plate which is similarly perforated, and is arranged and applied so as to be manipulated to open or close the perforations of the strainer, and thus adapt it, in the one case, for the passage of water to the waste-pipe, and in the other case to prevent the escape of the effluvia from the waste-pipe.

In the accompanying plate of drawings, Figure 1 is a sectional view of a portion of a sink and its waste-pipe, and of my improved strainer. Fig. 2 is a plan view of the strainer detached.

In the drawings, A represents the ordinary strainer of sinks; and this strainer is located, as usual, at the mouth of the waste-pipe; $a$, the perforations of the strainer A, for the passage of water from the sink to the waste-pipe; B, a plate perforated similarly to the strainer A, and located against the under side of the strainer, to which it is secured by a central screw, C, around which it is free to be turned; D, a knob attached to perforated plate B, and extending loosely through the slot $b$ of the strainer A. The slot $b$ is in the arc of a circle having its center at the axis of the central screw, and the slot as to length is such that, with the knob at its end $f$, the perforations of the plate B and strainer A will correspond or be in line with each other, and with the knob at its other end, $g$, the perforations of the plate and strainer will be out of line with each other, and thus those of the strainer A will be closed by the blank spaces between the perforations of the plate B.

For the passage of water through the strainer, force the knob D to the end $f$ of the slot $b$, and thus bring the perforations of the plate B into line with those of the strainer; for closing the strainer to the passage of water and to the escape of effluvia from the waste-pipe, force the knob D to the end $g$ of the slot $b$. The movement of the knob in the first direction opens the strainer, and in the second direction closes the strainer.

I do not claim, broadly, a valve for closing the strainer of a sink to prevent the effluvia escaping into the apartment; but

Having thus described my invention, what I claim, and desire to secure by Letters Patent, is—

The combination, with a sink, of the strainer A and perforated plate B, connected together at their center by a pivot, C, the said plate B having the handle D projecting vertically from it, as herein shown and described, for the object specified.

The above specification of my invention signed by me this 29th day of June, A. D. 1874.

S. PORTER.

Witnesses:
EDWIN W. BROWN,
GEO. H. EARL.